3,287,213
METHOD OF COMBATTING ARACHNIDS
AND FUNGI
Armand August Florent Busschots, Saint Truiden, Belgium, assignor to Janssen Pharmaceutica N.V., a corporation of Belgium
No Drawing. Filed July 29, 1965, Ser. No. 475,847
5 Claims. (Cl. 167—30)

This invention relates to di(p - chlorophenyl)-cyclopropyl-methanol and its usefulness as both an arachnicide and fungicide.

An object of this invention is to provide new and improved arachnicidal and fungicidal compositions comprising di-(p-chlorophenyl)-cyclopropyl-methanol as the active ingredient. Another object is to provide methods of combatting pests selected from the group consisting of arachnids and fungi with di-(p-chlorophenyl)-cyclopropyl-methanol and compositions thereof. Di(p-chlorophenyl)-cyclopropyl-methanol is structurally represented by the following formula:

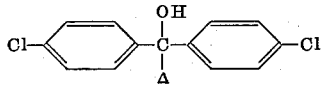

A

Di-(p-chlorophenyl)-cyclopropyl-methanol has been reported in the literature: Helv. Chim. Acta, 37, 2230 (1954). It is a white crystalline product; M.P. about 63° C.; density 1.26; and soluble at ordinary temperatures as follows: 0.27% in water (pH 6.7), 6.00% in heptane, 17.00% in petroleum, and more than 50% in such solvents as benzene, toluene, xylene, ethylbenzene, cumene, chlorobenzene, bromobenzene, carbon tetrachloride, dichloroethylene, isopropyl alcohol, acetone and methyl ethyl ketone. Toxicologically, it has an $LD_{50}$ in rats of 1600 mg./kg., and of more than 1000 mg./kg. in dogs.

It has now been found that di-(p-chlorophenyl)-cyclopropyl-methanol is an effective agent for the extermination of arachnids, such as, for example, mites and ticks, and, in addition, has anti-fungal properties. The subject compound, for example, has remarkable arachnicidal effectiveness in controlling such arachnids as Tetranychus urticae (Koch), Panonychus ulmi (Koch), Tarsonemus pallidus (Banks), and the like. It is a total arachnicide, killing eggs, larvae and adults. The subject compound is also fungicidally effective, for example, against *Fusarium culmorum*, *Alternaria Tenuis*, and *Botrytis cinerea* as demonstrated by in vitro experiments, and *Phytophthora infestans* as demonstrated by in vivo experiments.

The invention provides valuable arachnicidal and fungicidal compositions comprising di(p-chlorophenyl)-cyclopropyl-methanol as the active ingredient in a solvent or a solid, semi-solid or liquid diluent or carrier, the solvent diluent or carrier being non-toxic with respect to plants and warm-blooded animals.

The forms of application depend entirely on the purposes of use. The subject compound can be used in suitable solvents or diluents, in the form of emulsions, suspensions, or dipersions, on suitable solid or semi-solid carrier substances, in ordinary or synthetic soaps, detergents or dispersion media, if desired, together with other compounds having arachnicidal, insecticidal, ovicidal, fungicidal and/or bactericidal effects, or together with inactive additives.

Solid carrier substances which are suitable for the preparation of compositions in powder form include various inert, porous and pulverous distributing agents of inorganic or organic nature, such as, for example, tricalcium phosphate, calcium carbonate, in the form of prepared chalk or ground limestone, kaolin, bole, bentonite, talcum, kieselguhr and boric acid; powdered cork, sawdust, and other fine pulverous materials of vegetable origin are also suitable carrier substances.

The subject compound is mixed with these carrier substances, for example, by being ground therewith; alternatively, the inert carrier substance is impregnated with a solution of the active component in a readily volatile solvent and the solvent is thereafter eliminated by heating or by filtering with suction at reduced pressure. By adding wetting and/or dispersing agents, such as pulverous preparations can also be made readily wettable with water, so that suspensions are obtained.

Inert solvents used for the production of liquid preparations should preferably not be readily inflammable and should be as far as possible odorless and as far as possible non-toxic to warm-blooded animals or plants in the relevant surroundings. Solvents suitable for this purpose are high-boiling oils, for example, of vegetable origin, and lower-boiling solvents with a flash point of at least 30° C., such as, for example, isopropanol, hydrogenated naphthalenes and alkylated naphthalenes. A preferred solvent is dimethylsulfoxide.

It is, of course, also possible to use mixtures of solvents. Solutions can be prepared in the usual way, if necessary, with assistance of solution promoters. Other liquid forms which can be used consist of emulsions or suspensions of the subject compound in water or suitable inert solvents, or also concentrates for preparing such emulsions, which can be directly adjusted to the required concentration. For this purpose, the subject compound is, for example, mixed with a dispersing or emulsifying agent. The subject compound can also be dissolved or dispersed in a suitable inert solvent and mixed simultaneously or subsequently with a dispersing or emulsifying agent. Emulsions or suspensions ready for use are obtained by such a concentrate being diluted, for example, with water. Stable aqueous solutions (emulsoids) can be obtained with suitable concentration and mixing ratios of active component, emulsifier and water.

It is possible to use semi-solid carrier substances of a cream ointment, paste or waxlike nature, into which the subject compound can be incorporated, if necessary, with the aid of solution promoters and/or emulsifiers. Such semi-solid preparations usually constitute emulsions. Vaseline and other cream bases are examples of semi-solid carrier substances. The resulting preparations can be rubbed or smeared on areas for eradicating an arachnid infestation or for preventing an infection by fungi.

Furthermore, it is possible for the subject compound to be used in the form of aerosols. For this purpose, the compound is dissolved or dispersed, if necessary, with the aid of suitable inert solvents as carrier liquid, in a solvent, such as difluorodichloromethane, which at atmospheric pressure boils at a temperature lower than room temperature, or in other volatile solvents. In this way, solutions under pressure are obtained which when sprayed, yield aerosols which are particularly suitable for controlling fungi and arachnids, e.g., in closed chambers, in grain silos and other storage rooms, and for application to vegetation for eradicating an arachnid infestation or for preventing an infection by fungi.

Examples of other additives which can be admixed with the said preparations are: adhesive substances, such as casein, fatty acid salts, size, resins, fats, protein decomposition products; wetting agents, solution promoters, dyestuffs, odorous substances; dust-bonding agents in the case of pulverous preparations.

By suitable choice of the various dispersion media and additives, it is readily possible to modify the composition and consequent properties of the agents to make them suitable for any given purpose.

The subject compound and the arachnicidal and fungicidal compositions thereof can be applied by conventional methods. The arachnids and fungi or the material to be treated or to be protected against attack by arachnids and fungi can be treated with the subject compound and the arachnicidal and fungicidal compositions thereof by dusting, sprinkling, spraying, brushing, dipping, smearing, impregnating or other suitable means.

Examples of emulsifiers which are suitable for the production of aqueous solutions and emulsions are mainly soaps, but also sulphonated fats, fatty acid esters and fatty alcohol sulphonates, quaternary ammonium compounds of relatively high molecular weight, and also nonionic emulsifiers, such as condensation products of fatty alcohols with ethylene oxide. It is, however, also possible to produce emulsions of ointment-like consistency, for example, using stearic acid, fatty acid salts and water. For producing non-greasy ointments, it is possible to use bases of cellulose ethers or other swellable substances of animal, vegetable or synethetic origin and water, or also inorganic substances, such as, for example, aluminum hydroxide oil, into which the effective substances are incorporated, if necessary, with the aid of emulsifiers, and/or solution promoters. If desired, the preparations obtained can also be perfumed by adding odorous substances. Examples of good powdered carrier substances which are capable of adhering are talcum, starch and lactose.

When the subject compound is employed in combination with suitable carriers, e.g., in solution, suspension, dust, emulsion, and the like forms, a high activity over a very high range of dilution is observed. For example, concentrations of the active ingredient ranging from 10–1000 parts per million (p.p.m.) by weight, based on the weight of composition employed, have been found effective in combatting fungi, mites and the like. Of course, higher concentrations may also be employed as warranted by the particular situation.

The following examples are intended to illustrate, but not to limit, the scope of the present invention.

EXAMPLE I

Starting from 441 parts p-dichlorobenzene, 73 parts magnesium and 1350 parts tetrahydrofurane, a solution of 4-chlorophenyl-magnesium chloride is prepared in the usual manner. To this solution is added dropwise at reflux temperature a solution of 150 parts ethyl cyclopropanecarboxylate in 900 parts tetrahydrofurane. After the addition is complete, the whole is stirred and refluxed for another hour. After cooling, the reaction mixture is poured into a mixture of 750 parts crushed ice and 180 parts glacial acetic acid. The acid layer is separated and extracted with 200 parts benzene. The extract is dried over magnesium sulfate and evaporated. The oily residue is distilled in vacuo, to yield crude, oily cyclopropyl-di-(4-chloro-phenyl)-carbinol. This oil solidifies on standing. After recrystallization of this solid from 800 parts petroleum ether, pure cyclopropyl-di-(4-chloro-phenyl)-carbinol are obtained; M.P. 58.8–61.2° C.

EXAMPLE II

This example demonstrates the fungicidal effectiveness of di-(p-chlorophenyl)-cyclopropyl-methanol, as compared against controls and other known fungicides. The method consists in intimately mixing the subject compound in various concentrations (parts per million) with liquefied malt-agar just before the agar solidifies. Twenty cubic centimeters of the mixtures are then poured into Petri-dishes. When the agar is solidified, circular discs of filter-paper having a diameter of 1.3 cm. are dipped into a solution of spores (concentration: 100,000 spores per cc.) of a particular fungus and deposited on the surface of the agar. The fungicidal value is measured by comparing the zone of mycelial growth of the fungus around the discs. The results tabulated below represent the recorded growth after the sixth day of inoculation, the control value being arbitrarily set at 100%.

*A*=di-(p-chlorophenyl)-cyclopropyl-methanol.
*B*=zinc ethylene bis-dithiocarbamate.
*C*=tetramethylthiuramdisulfide.

| Fungicide | Concn. (p.p.m.) | Zone of Mycelial Growth (percent) | | |
|---|---|---|---|---|
| | | *Fusarium culmorum* | *Alternaria tenuis* | *Botrytis cinerea* |
| Control | ------------ | 100 | 100 | 100 |
| A | 1,000 | 0 | 0 | 0 |
| | 500 | 0 | 0 | 0 |
| | 100 | 1 | 11 | 7 |
| | 50 | 12 | 8 | 7 |
| | 10 | 20 | 45 | 32 |
| | 5 | 23 | 55 | 25 |
| B | 1,000 | 0 | 6 | 0 |
| | 500 | 0 | 13 | 0 |
| | 100 | 62 | 46 | 28 |
| | 50 | 80 | 70 | 50 |
| | 10 | 88 | 96 | 75 |
| | 5 | 92 | 95 | 78 |
| A | 1,000 | 1 | 3 | ------------ |
| | 100 | 9 | 5 | ------------ |
| | 10 | 16 | 52 | ------------ |
| | 1 | 33 | 96 | ------------ |
| C | 1,000 | 0 | 0 | ------------ |
| | 100 | 5 | 0 | ------------ |
| | 10 | 72 | 35 | ------------ |
| | 1 | 76 | 90 | ------------ |
| A | 50 | 15 | 28 | 25 |
| | 25 | 20 | 33 | 32 |
| | 12.5 | 20 | 46 | 44 |
| | 6.25 | 26 | 55 | 62 |
| | 3.12 | 22 | 69 | 76 |
| C | 50 | 0 | 0 | 0 |
| | 25 | 0 | 37 | 0 |
| | 12.5 | 29 | 39 | 0 |
| | 6.25 | 32 | 51 | 52 |
| | 3.12 | 72 | 76 | 71 |

EXAMPLE III

This example demonstrates a tomato foliage disease test in a greenhouse which measures the percent control of late blight fungus, *Phytophthora infestans*. According to the test procedure, tomato plants are sprayed with fungicidal dispersions of various concentrations (p.p.m.) and, after drying of the spray coating, the plants, including untreated controls, are sprayed with and thereby artificially infected with the desired fungi. The infection with *Phytophthora infestans* is accomplished by means of a spore suspension thereof (concentration: 10,000 zoosporangia per cc.). The tomato plants are subsequently held in a steam-saturated atmosphere for 24 hours at 18–20° C. to permit spore germination and infection before removal to the greenhouse. The area of fungus attack appears as necrotic spots on the leaves. After 4–6 days, the fungicidal evaluation is accomplished by calculating the percentage of leaves affected as compared with the damage done to the leaves of untreated plants. The test is described in the literature by P.

Schicke, "Uber eine einfache Versuchsanordnung der Fungicidteste mit Phytophthora infestans" (Mont.) de By. Nachrichtenbl. Deutsch. Pflanzenschutzd. (Braunschweig) 7, p. 120-2 (1955). The results are tabulated below:

A=di-(p-chlorophenyl)-cyclopropyl-methanol.
B=zinc ethylene bis-dithiocarbamate.

| Fungicide | Concn. (p.p.m.) | Percent Leaves Affected |
|---|---|---|
| Control | | 73.1 |
| A | 1,000 | 1.8 |
|   | 100 | 9.5 |
|   | 10 | 34.8 |
| B | 1,000 | 1.8 |
|   | 100 | 20.9 |
|   | 10 | 34.4 |
| Control | | 71.1 |
| A | 500 | 10.8 |
|   | 250 | 12.5 |
|   | 125 | 19.8 |
| B | 500 | 18.1 |
|   | 250 | 25.4 |
|   | 125 | 46.4 |

EXAMPLE IV

This example illustrates the effectiveness of di-(p-chlorophenyl)-cyclopropyl-methanol in controlling *Tetranychus urticae* in its adult stage. Bean plants having two leaves are artificially infested with 10 such adults per leaf. The plants are then sprayed with arachnicidal dispersions of the subject compound and known arachnicides in various concentrations (p.p.m.) assuring a good coverage of all the leaves. Mortality counts are taken after a few days.

A=di-(p-chlorophenyl)-cyclopropyl-methanol.
D=methyl chinoxaline-2,3-dithiocarbamate.
E=1,1-bis(4-chlorophenyl)2,2,2-trichloroethanol.

| Acaricide | Concn. (p.p.m.) | Percent Mortality After 2 Days |
|---|---|---|
| Control | | 10 |
| A | 300 | 100 |
|   | 150 | 100 |
|   | 75 | 100 |
|   | 35 | 100 |
| E | 300 | 90 |
|   | 150 | 86 |
|   | 75 | 61 |
|   | 35 | 62 |
| Control | | 0 |
| A | 1,000 | 100 |
|   | 500 | 100 |
|   | 250 | 100 |
|   | 125 | 100 |
|   | 62.5 | 100 |
| D | 1,000 | 72 |
|   | 500 | 55 |
|   | 250 | 23 |
|   | 125 | 0 |
|   | 62.5 | 0 |

EXAMPLE V

The larvicidal effectiveness of di-(p-chlorophenyl)-cyclopropyl-methanol is illustrated herein using the method described by G. Dosse: Beitrage zur biologie, verbreitung und bekampfung der Milbe Brevipalpus Oudemansi Geyskes Z. eng. Ent. 37: 437-446 (1955). Mites (*Tetranychus urticae*) are placed on discs (diam.=18 mm.) punched from strawberry leaves lying on wet sand in Petri-dishes. After having laid eggs during a period of 2 days, the mites are removed. When nearly 60% of the eggs are hatched, the larvae are sprayed with various concentrations (p.p.m.) of the subject compound (A). Mortality counts are taken after 2 days.

| | Concn. (p.p.m.) | Percent Mortality |
|---|---|---|
| Control | | 4 |
| A | 500 | 100 |
|   | 250 | 100 |
|   | 125 | 100 |
|   | 62.5 | 100 |

EXAMPLE VI

The ovicidal and larvicidal activity of di-(p-chlorophenyl)-cyclopropyl-methanol is demonstrated herein. The method used is similar to that described in Example V. After having laid eggs during a period of 2 days, the mites are removed. Acaricidal treatment is then carried out on eggs having respective ages of about 2, 4 and 8 days. Ten days after such treatments, counts are made on the number of eggs hatched and the number of larvae killed.

A=di-(p-chlorophenyl)-cyclopropyl-methanol.
E=1,1-bis(4-chlorophenyl)2,2,2-trichloroethanol.

| Acaricide | Concn. (p.p.m.) | Percent Eggs Hatched | | |
|---|---|---|---|---|
| | | Age of the Eggs (days) | | |
| | | 2 | 4 | 8 |
| Control | | 69 | | |
| A | 40 | 6 | 7 | 0 |
|   | 20 | 30 | 43 | 6 |
|   | 10 | 25 | 61 | 15 |
| E | 40 | 12 | 26 | 34 |
|   | 20 | 20 | 49 | 42 |
|   | 10 | 45 | 53 | 67 |
| | | Percent Larvae Killed | | |
| Control | | 0 | | |
| A | 40 | 97 | 93 | 100 |
|   | 20 | 94 | 69 | 100 |
|   | 10 | 67 | 100 | 89 |
| E | 40 | 95 | 92 | 91 |
|   | 20 | 85 | 74 | 80 |
|   | 10 | 79 | 50 | 77 |

EXAMPLE VII

Strawberry leaves heavily infested with *Tarsonemus pallidus* (Banks) are dipped into suspensions of di-(p-chlorophenyl)-cyclopropyl-methanol (A) in various concentrations (p.p.m.) and then conserved in Petri-dishes. Mortality counts are taken after 48 hours. The percentages below represent the average of 10 observations per concentration level.

| | Concn. (p.p.m.) | Percent Mortality |
|---|---|---|
| Control | | 5.9 |
| A | 1,000 | 97.8 |
|   | 500 | 96.2 |

EXAMPLE VIII

This example illustrates the effectiveness of di-(p-chlorophenyl)-cyclopropyl-methanol in a field experiment using apple trees (variety: James Grieves on rootstock IV, 12 years old) infested with mites, *Panonychus ulmi* (Koch). Before spraying with the arachnicide, the population density per tree is recorded by means of a mite brushing machine. Heavily infested trees are used in the experiment.

A=di-(p-chlorophenyl)-cyclopropyl-methanol.
E=1,1-bis(4-chlorophenyl)-2,2,2-trichloroethanol.
F=0,0 - diethyl - 5-(4-oxybenzotriazine)-3-methyldithiophosphate.
G=0,0-dimethyl-5-ethyl-sulfoxy-ethylthiophosphate.

| Arachnicide | Concn. (Percent) | Number per 50 Leaves ||||||
|---|---|---|---|---|---|---|---|
| | | Before Spraying ||| 3 Days After Spraying |||
| | | Adults | Larvae | Eggs | Adults | Larvae | Eggs |
| Untreated | | 32 | 48 | 120 | 40 | 24 | 72 |
| A | 0.05 | 64 | 128 | 128 | 0 | 0 | 40 |
| | 0.04 | 32 | 80 | 168 | 0 | 0 | 80 |
| | 0.03 | 24 | 32 | 64 | 0 | 0 | 88 |
| | 0.02 | 32 | 8 | 160 | 0 | 0 | 72 |
| | 0.01 | 40 | 32 | 240 | 0 | 16 | 48 |
| E | 0.05 | 88 | 112 | 568 | 0 | 0 | 0 |
| | 0.04 | 72 | 88 | 160 | 0 | 8 | 48 |
| | 0.03 | 56 | 40 | 112 | 24 | 8 | 112 |
| | 0.02 | 56 | 64 | 212 | 28 | 2 | 72 |
| | 0.01 | 48 | 24 | 192 | 40 | 40 | 96 |
| | | ||| 11 Days After Spraying |||
| Untreated | | 560 | 480 | 1,920 | 220 | 1,688 | 2,208 |
| A | 0.05 | 334 | 240 | 1,800 | 0 | 72 | 168 |
| F | 0.025 | 224 | 288 | 759 | 0 | 8 | 168 |
| | | ||| 14 Days After Spraying |||
| Untreated | | (¹) | (¹) | (¹) | 1,128 | 1,960 | 680 |
| A | 0.025 | 256 | 120 | 728 | 24 | 56 | 24 |
| | 0.005 | 320 | 360 | 1,688 | 104 | 64 | 11 |
| | | ||| 21 Days After Spraying |||
| Untreated | | 312 | 392 | 440 | 120 | 80 | 80 |
| A | 0.03 | 117 | 328 | 552 | 0 | 0 | 0 |
| | 0.0275 | 368 | 320 | 360 | 0 | 0 | 0 |
| | 0.025 | 328 | 374 | 360 | 0 | 0 | 0 |
| G | 0.03 | 197 | 328 | 536 | 36 | 56 | 40 |
| | 0.0275 | 248 | 392 | 408 | 36 | 32 | 16 |
| | 0.025 | 304 | 288 | 208 | 40 | 80 | 24 |
| | | ||| 21 Days After Spraying |||
| Untreated | | 32 | 48 | 120 | 96 | 88 | 96 |
| A | 0.05 | 64 | 128 | 128 | 0 | 0 | 0 |
| | 0.04 | 32 | 80 | 168 | 0 | 0 | 0 |
| | 0.03 | 24 | 32 | 64 | 0 | 0 | 0 |
| | 0.02 | 32 | 8 | 160 | 8 | 8 | 24 |
| | 0.01 | 40 | 32 | 240 | 36 | 40 | 56 |
| E | 0.05 | 88 | 112 | 568 | 0 | 0 | 0 |
| | 0.04 | 72 | 88 | 160 | 0 | 0 | 0 |
| | 0.03 | 56 | 40 | 112 | 0 | 0 | 0 |
| | 0.02 | 56 | 64 | 212 | 16 | 8 | 32 |
| | 0.01 | 48 | 24 | 192 | 32 | 48 | 16 |

¹ Not counted.

EXAMPLE IX (A) The acaricidal effectiveness of di-(p-chlorophenyl)-cyclopropyl-methanol (A) in combatting *Tetranychus urticae* is compared with di-(p-chlorophenyl)-propylcarbinol (H). Bean plants are artificially infested with 10 adults per leaf and then sprayed with dispersions of (A) and (H) in various concentrations (p.p.m.) assuring a good coverage of all the leaves. Mortality counts are taken 24 hours after treatment.

| | Concn. (p.p.m.) | Percent Mortality |
|---|---|---|
| Control | | 0 |
| A | 50 | 100 |
| | 25 | 100 |
| | 12.5 | 100 |
| H | 50 | 72 |
| | 25 | 68 |
| | 12.5 | 52 |

(B) Ovicidal and larvicidal effectiveness is determined as in Examples V and VI. After having laid eggs during a period of 2 days, the mites are removed and the resulting eggs and larvae treated with various concentrations of A and H. The percent larvae killed is examined two days after treatment and the percent of eggs hatched is examined seven days after treatment. At the concentrations used, H is substantially devoid of any ovicidal or larvicidal effectiveness.

| | Concn. (p.p.m.) | Percent Eggs Hatched |
|---|---|---|
| Control | | 98 |
| A | 50 | 0 |
| | 25 | 13 |
| | 12.5 | 30 |
| H | 50 | 90 |
| | 25 | 96 |
| | 12.5 | 84 |
| | | Percent Larvae Killed |
| A | 50 | 100 |
| | 25 | 100 |
| | 12.5 | 93 |
| H | 50 | 5 |
| | 25 | 3 |
| | 12.5 | 6 |

EXAMPLE X

The compositions according to the invention are employed in those forms which are customarily used for arachnid and fungus control, for example, as suspensions, dusting powders, solutions and the like in inert carriers. The following will further illustrate the invention, the parts being parts by weight unless otherwise specified:

(1) *Suspension:*
1 kg., di-(p-chlorophenyl)-cyclopropyl-methanol
2 l., technical xylene
350 ml., surface active agent (polyoxyethylene triglyceride-alkylarylsulfonate)
Water, dilute to desired concentration of active ingredient The di-(p-chlorophenyl)-cyclopropyl-methanol forms a stable aqueous suspension when dissolved in the xylene and emulsified by means of the surface active agent.

(2) *Dusting powder*: 20 parts of di-(p-chlorophenyl)-cyclopropyl-methanol are ground with 360 parts of talcium in a ball mill, then 8 parts of olein are added and grinding is continued, and finally the mixture is mixed with 4 parts of slaked lime. The powder which is formed can be sprayed satisfactorily and has good adhesive power. It can be used for dusting rooms and objects infested with mites, ticks, fungi and the like or for plant protection purposes. An even better distribution of the active substance on the carrier material is obtained if the carrier is impregnated with a solution of the active substance, for example, in acetone or isopropanol, and the solvent is thereafter vaporized.

(3) *Dusting Powder*: 80 parts of di-(p-chlorophenyl)-cyclopropyl-methanol are intimately triturated with 20 parts of talc. This concentrate can be used directly as a dusting powder for attacking mites and fungi, but it can also be further diluted to any desired concentrations.

(4) *Solution*: 5 parts of di-(p-chlorophenyl)-cyclopropyl-methanol are dissolved in 95 parts of alkylated naphthalene and used as a domestic spray for the treatment of walls and floors, for example, in combatting mites and ticks or to prevent infection by fungi.

What is claimed is:

1. The method of combatting pests selected from the group consisting of arachnids and fungi which comprises subjecting said pests to the action of di-(p-chlorophenyl)-cyclopropyl-methanol.

2. The method of combatting arachnids which comprises treating said arachnids with an arachnicidal amount of di-(p-chlorophenyl)-cyclopropyl-methanol.

3. The method of combatting arachnids which comprises applying to arachnid-infested subjects an arachnicidal amount of di-(p-chlorophenyl)-cyclopropyl-methanol.

4. The method of killing mites which comprises treating said mites with a miticidal amount of di-(p-chlorophenyl)-cyclopropyl-methanol.

5. The method of combatting fungi which comprises treating said fungi with a fungicidal amount of di-(p-chlorophenyl)-cyclopropyl-methanol.

References Cited by the Examiner

Biro: Chem. Abstracts, 49, 3906*i*, 3907*h* (1955).

JULIAN S. LEVITT, *Primary Examiner.*

STANLEY J. FRIEDMAN, *Assistant Examiner.*

UNITED STATES PATENT OFFICE
CERTIFICATE OF CORRECTION

Patent No. 3,287,213                                                November 22, 1966

Armand August Florent Busschots

It is hereby certified that error appears in the above numbered patent requiring correction and that the said Letters Patent should read as corrected below.

Column 5, first table, third column, line 14 thereof, for "46.4" read -- 56.4 --; column 6, second table, under the heading "Percent Larvae Killed" fourth column thereof, line 7 thereof, for "50" read -- 60 --; columns 7 and 8, in the first table, under the heading "11 Days After Spraying", last column, line 3 thereof, for "168" read -- 208 --; same table, under the heading "14 Days After Spraying", last column, lines 2 and 3 thereof, for "24" and "11" read -- 248 -- and -- 112 --, respectively; column 9, line 21, for "talcium" read -- talcum --.

Signed and sealed this 11th day of March 1969.

(SEAL)
Attest:

Edward M. Fletcher, Jr.                                    EDWARD J. BRENNER
Attesting Officer                                            Commissioner of Patents